(12) United States Patent
Egger et al.

(10) Patent No.: US 12,715,708 B2
(45) Date of Patent: Aug. 25, 2026

(54) CONVEYOR BELT CALIBRATION DEVICE

(71) Applicants: James Lee Egger, Jupiter, FL (US); Robert Paul Egger, Jupiter, FL (US)

(72) Inventors: James Lee Egger, Jupiter, FL (US); Robert Paul Egger, Jupiter, FL (US)

( * ) Notice: Subject to any disclaimer, the term of this patent is extended or adjusted under 35 U.S.C. 154(b) by 100 days.

(21) Appl. No.: 18/952,327

(22) Filed: Nov. 19, 2024

(65) Prior Publication Data

US 2025/0074715 A1 Mar. 6, 2025

Related U.S. Application Data

(63) Continuation-in-part of application No. 18/627,803, filed on Apr. 5, 2024, now Pat. No. 12,595,133.

(60) Provisional application No. 63/496,194, filed on Apr. 14, 2023.

(51) Int. Cl.
*B65G 43/02* (2006.01)
*G01B 11/04* (2006.01)

(52) U.S. Cl.
CPC ............ *B65G 43/02* (2013.01); *G01B 11/043* (2013.01)

(58) Field of Classification Search
CPC .............................. B65G 43/02; G01B 11/043
USPC .......................................................... 198/500
See application file for complete search history.

(56) References Cited

U.S. PATENT DOCUMENTS

2016/0193946 A1* 7/2016 Dillinger ................ B60N 2/888
297/216.12

FOREIGN PATENT DOCUMENTS

EP 3539906 A1 * 9/2019 ............. B65G 43/02

OTHER PUBLICATIONS

EP3539906 (Year: 2019).*

* cited by examiner

*Primary Examiner* — Gene O Crawford
*Assistant Examiner* — Lester Rushin, III
(74) *Attorney, Agent, or Firm* — McHale & Slavin, P.A.

(57) ABSTRACT

A device for calibrating a conveyor belt and measuring full belt length for predictive failure/maintenance of the belt. The device comprises a housing with a remote controller assembly. The remote controller is secured to the housing for storage and shipping. When the remote controller is detached, a sensor encoder assembly using wheels is deployed for use in the calibrate procedure. The housing is set adjacent a conveyor belt using a support having a polyaxial coupling wherein wheel encoder sensors are set onto the conveyor belt that is to be measured. Jogging the conveyor belt at set intervals, the encoder sensor assembly self-aligns while measuring the distance traversed and calculates the appropriate length correcting or speed that can be inputted to a conveyor belt control system. An attached reflective marking can be used in combination with an IR sensor to measure sizes to enhance the ability to predict failure/maintenance.

14 Claims, 17 Drawing Sheets

60
51
28
50
32
68
34
58
52
10
12
14

61
62
50
27
32
78
34
68
18
34
26
32
79
10
20
21
24
22

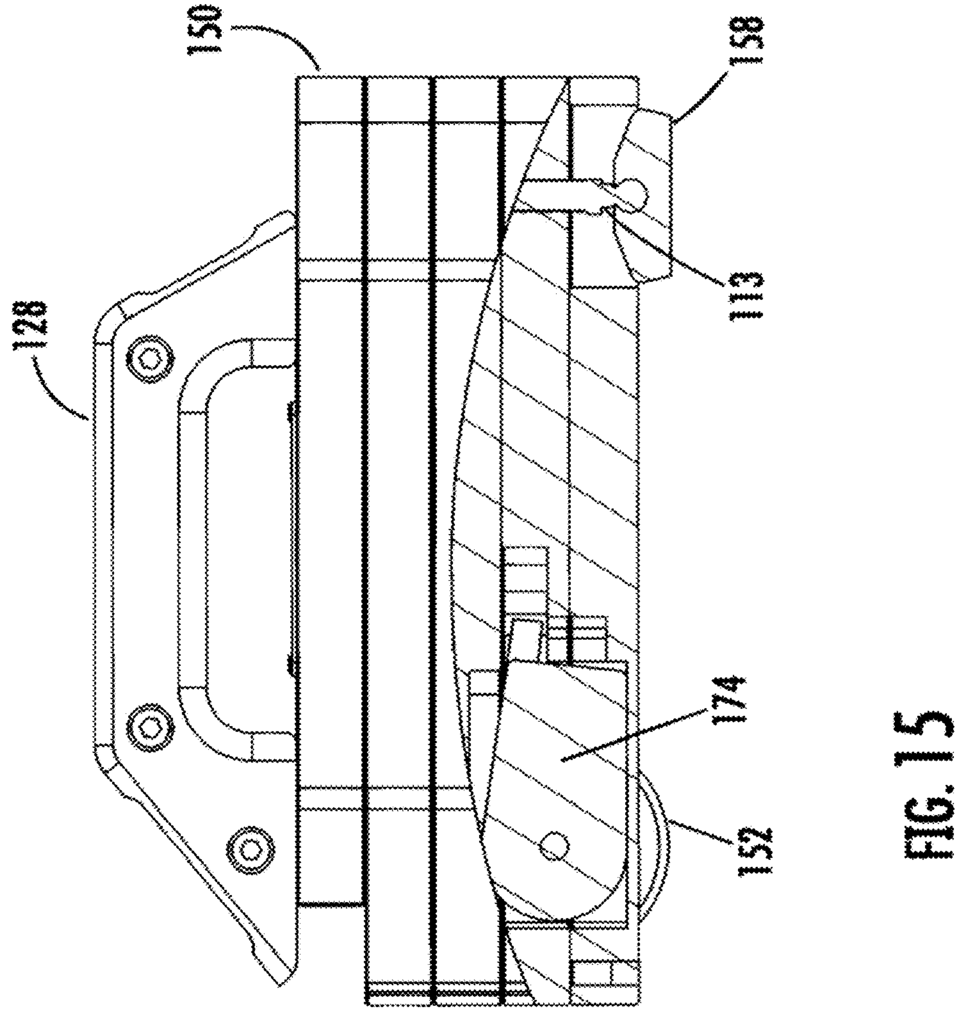
FIG. 15
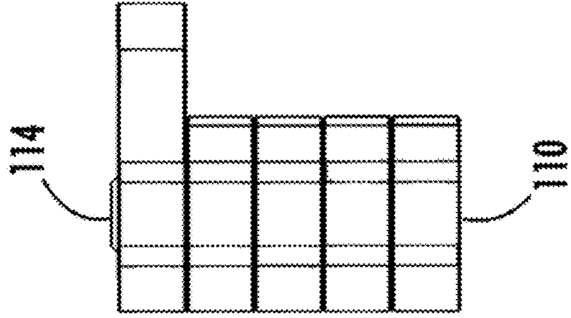

CONVEYOR BELT CALIBRATION DEVICE

PRIORITY CLAIM

In accordance with 37 C.F.R. 1.76, a claim of priority is included in an Application Data Sheet filed concurrently herewith. Accordingly, the present invention is a Continuation-In-Part and claims priority to U.S. patent application Ser. No. 18/627,803 entitled "CONVEYOR BELT CALIBRATION DEVICE", filed Apr. 5, 2024 which claims priority based upon U.S. Provisional Patent Application No. 63/496,197, entitled "CONVEYOR BELT CALIBRATION DEVICE", filed Apr. 14, 2023, the contents of which are incorporated herein by reference in its entirety.

FIELD OF THE INVENTION

The field of the invention is calibration devices and, in particular, to an improved conveyor belt calibration device.

BACKGROUND OF THE INVENTION

Servo-controlled conveyor belts are used in modern industries that require material handling with precise control. For instance, most modern manufacturing processes employ servo-controlled conveyor belts for the automated movement of components between different stages of production. The servo-controlled conveyor belt allows for precise control over speed and positioning required in assembly lines. Servo-controlled conveyors are also commonly found in packaging lines where accurate and synchronized movement of packages is necessary, wherein the conveyor lines enable efficient handling of products during the packaging process and may accommodate variable speeds for different packaging requirements. In the food and beverage industry, servo-controlled conveyor belts are used for transporting products during processing, packaging, and sorting. Automated warehouses and distribution centers utilize servo-controlled conveyors for sorting and transporting packages with the ability to control speed, direction, and positioning to control the flow of goods. Servo-controlled conveyor systems are commonly used in automotive manufacturing for the assembly and transportation of vehicle components along the production line. In the electronics industry, like the automotive industry, servo-controlled conveyors are employed to transport components through the production line and can provide exact positioning of products for purposes of welding, soldering, assembling, inspection, and/or testing processes.

A common objective when using conveyor belts is to provide precise movement of components which contribute to increased efficiency, reduced errors, and improved overall productivity. Servo-controlled conveyor belts utilize servo motors for precise control and automation. A servo motor provides feedback control for adjusting its position to maintain a desired output. Servo control allows for precise speed and position control, making it possible to optimize the movement of components places on the conveyor belt. The servo-controlled conveyor belt provides high precision in controlling speed and position, or enables variable speeds along the conveyor belt. Servo-controlled conveyor belts can be used in automated systems where items need to be transported and processed without manual intervention. Servo systems typically include feedback devices such as encoders, which provide real-time information about the motor's position allowing to the system make continuous adjustments to maintain the desired position and speed. The precise control offered by servo motors allows for accurate positioning of items on the conveyor belt finding application in industries such as manufacturing, packaging, and logistics, where precise and automated movement of goods is essential for efficiency and quality control.

However, conveyor belt systems can become uncalibrated due to wear, tear, stretching or a combination thereof which can cause a conveyor belt line to shut down. In an effort to prevent systems from becoming unsynchronized, routine maintenance is periodically scheduled. A common maintenance procedure in the industry requires three individuals to calibrate a single conveyor belt using a tape-measure/ruler procedure, which takes about twenty minutes. Use of multiple individuals to check the calibration is costly both in time and manpower. Not only the manual checking dependent upon human interpretation, improperly training regarding calibration can result in problems when there was none.

What is needed in the industry is a device capable of calibrating a conveyor belt in minimal time requiring a single individual employing digital sensors to eliminate human error.

SUMMARY OF THE INVENTION

Disclosed is a remote controlled calibration device that is self-contained for ease of storage and protection of the calibration fixture. The remote controller detaches from a housing containing a wheel mounted encoder sensor for conveyor belt length measurement. Upon detachment of the remote controller, power to the controller and fixture is automatically turned on. With the controller detached, a set of wheels extend beneath one end the housing is placed on a conveyor belt and a second end of the housing having a support base coupled to a polyaxial connector is placed on a fixed surface. The wheel assembly includes a encoder sensor and a support base form a three point stance allowing for level self-adjustment. An IR sensor is placed on the bottom surface, adjacent an edge of the housing along the first end, for use in detecting a beginning and end position on the conveyor.

When an operator begins jogging the conveyor belt at set intervals, the encoder sensor automatically begins measuring the distance traversed by the wheels, and when the conveyor belt stops, it will send the signal to the remote, where the exact length is displayed and then can be inputted into the conveyor belt control system for calibration. Alternatively, the distance traversed can be sent actively to the remote for instantaneous display or calculation of belt speed. When the calibration check is complete, the remote is attached to the housing which disables the sensor. When the remote is placed into a storage position, power to the components is shut off. A 5-volt DC barrel jack is coupled to the housing and used to recharge a battery used in the remote control and the battery used in the housing for the wheel sensor circuitry.

An objective of the invention is to provide a self-contained conveyor belt calibration device that can be used to predict conveyor belt maintenance or failure.

Still another objective of the invention is to provide a conveyor belt calibration device with a digital readout that can be performed by a single individual in about three minutes, with the calibration data available to be inputted to the tested calibration system.

Yet another objective of the invention is to provide a conveyor belt calibration device having wheels for placement on a conveyor belt using an encoder to conveyor belt length. An IR sensor is constructed and arranged to detect a temporarily attached reflective start/stop point to measure the full length of a conveyor belt and predict failure based on belt wear/stretch over its lifetime.

Another objective of the invention is to provide a compact, lightweight, and portable wireless calibration device wherein a remote controller is removably attached to sensor housing.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE DRAWINGS

FIG. 15 is a cross sectional side view;

DETAILED DESCRIPTION OF THE INVENTION

Figure 1:
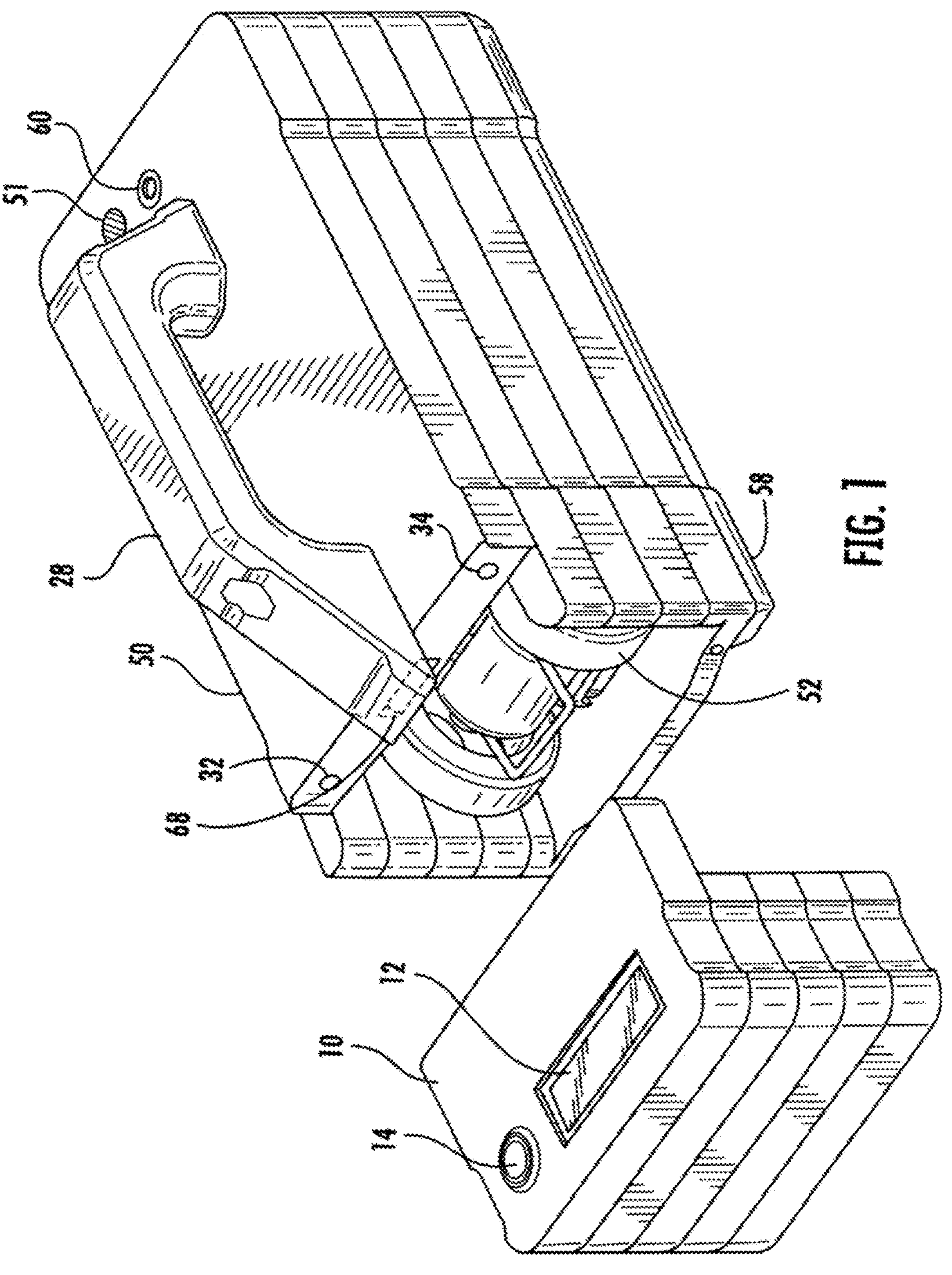
FIG. 1 is an exploded view of the remote controller and a housing.
Figure 2:
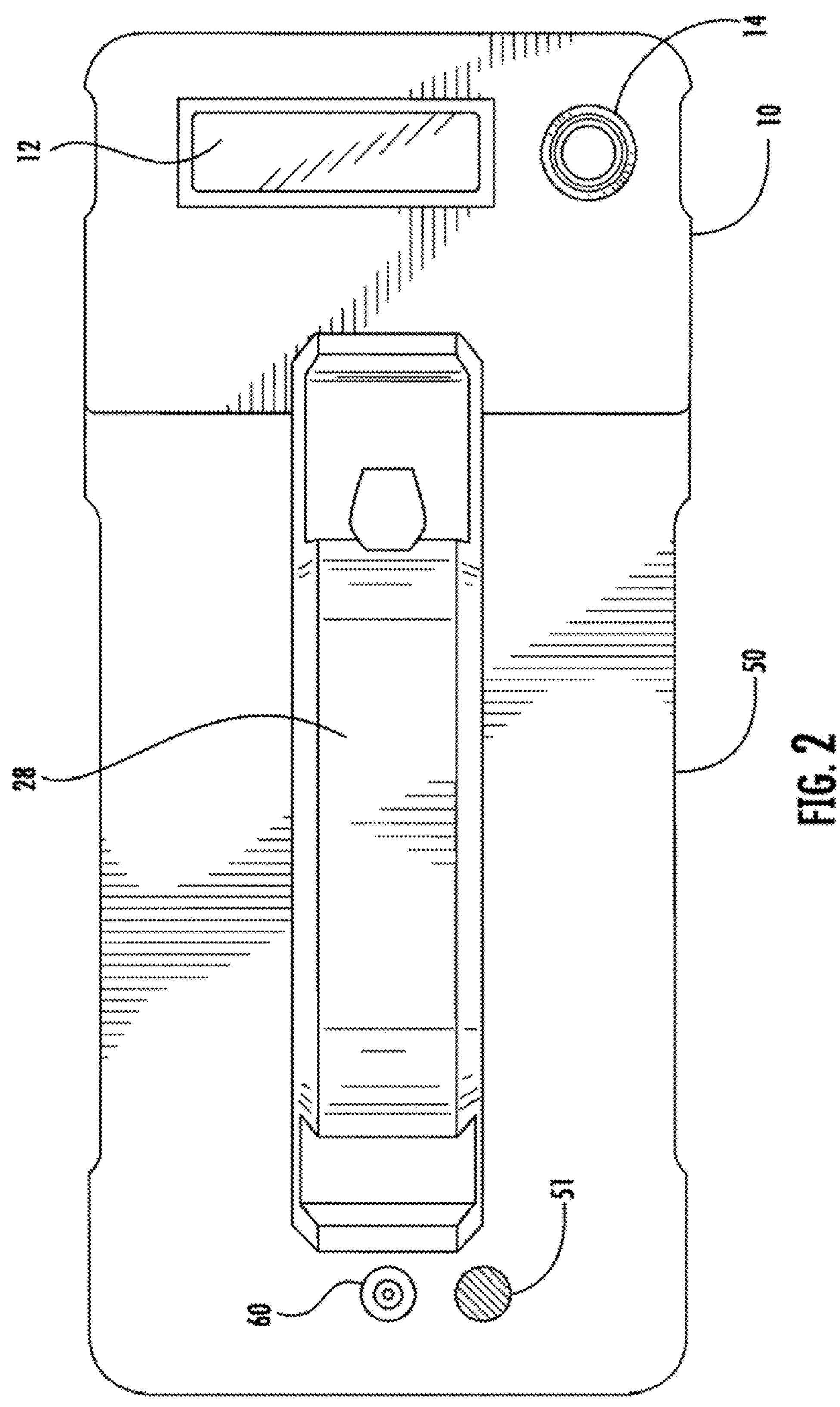
FIG. 2 is a top view of the remote controller and the housing secured together.
Figure 3:
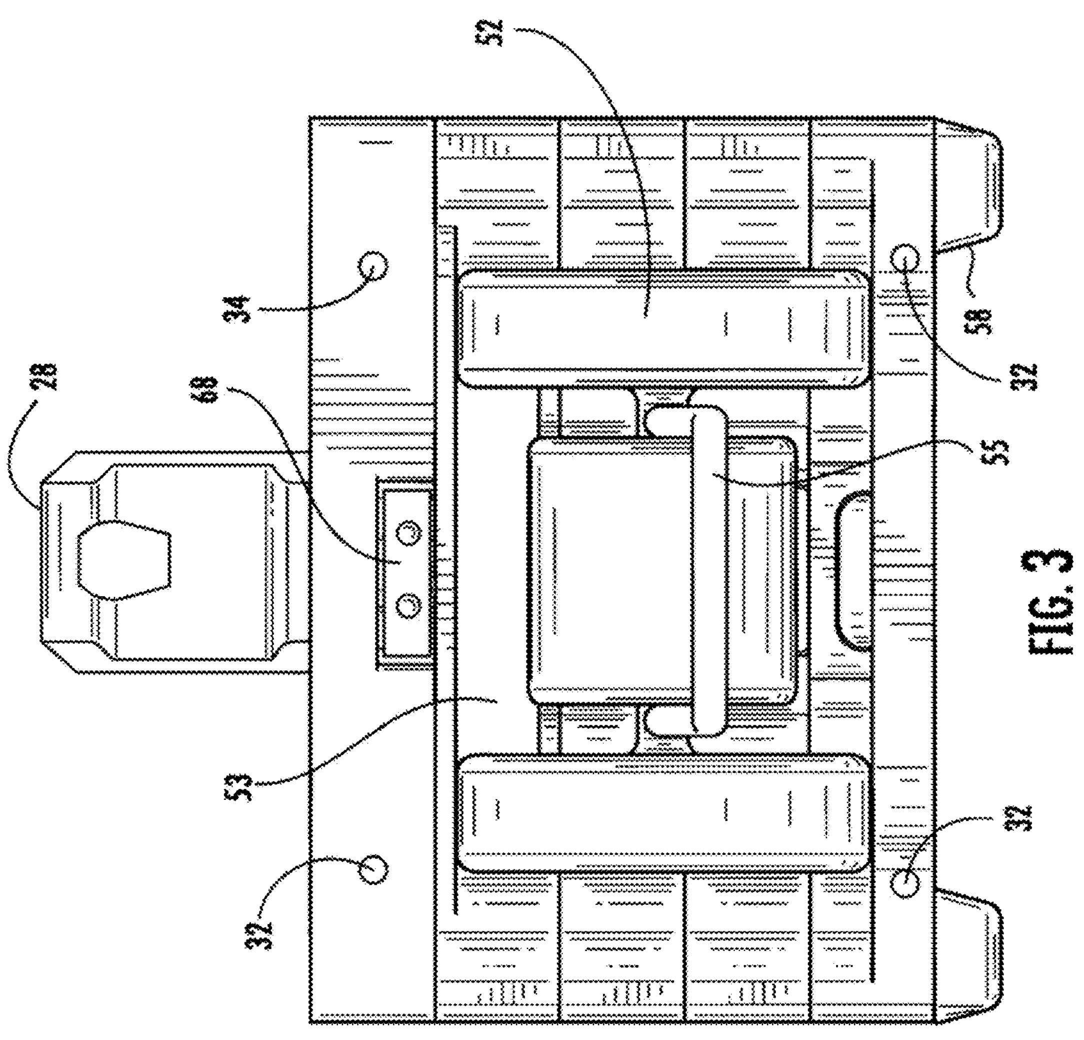
FIG. 3 is front view thereof.
Figure 4:
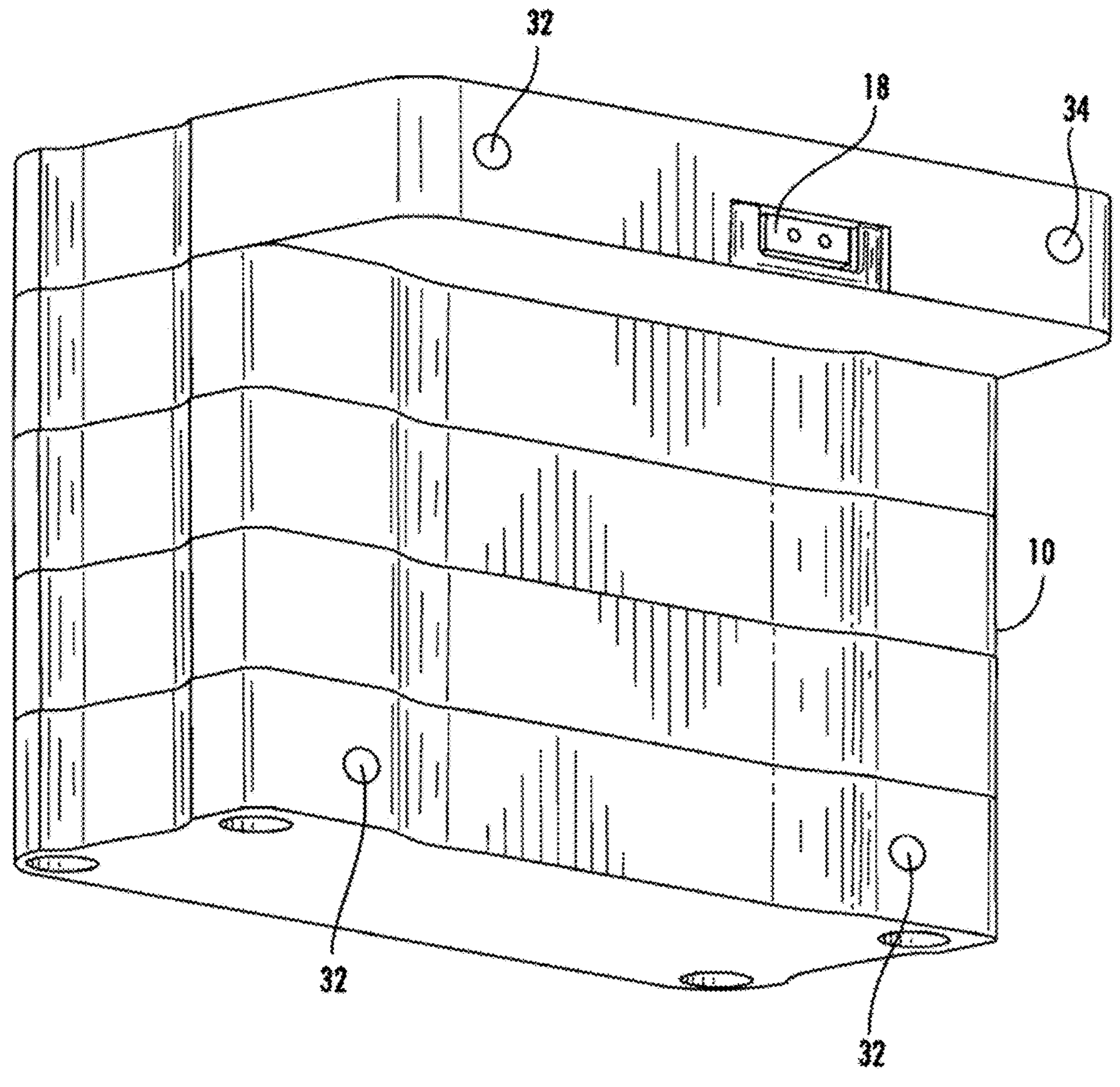
FIG. 4 is a lower perspective view of the remote controller.
Figure 5:
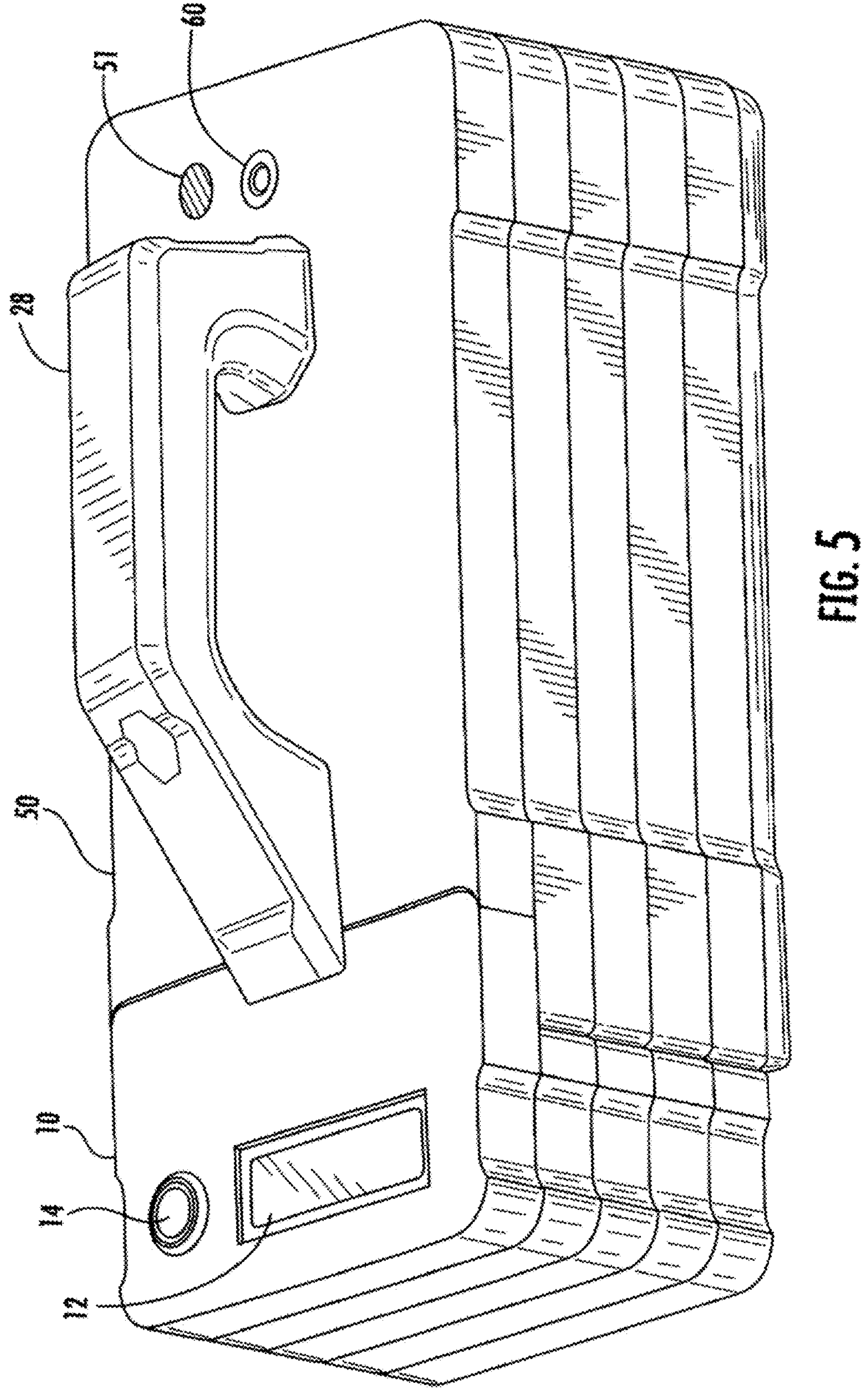
FIG. 5 is a perspective view of the remote controller and the housing.
Figure 6:
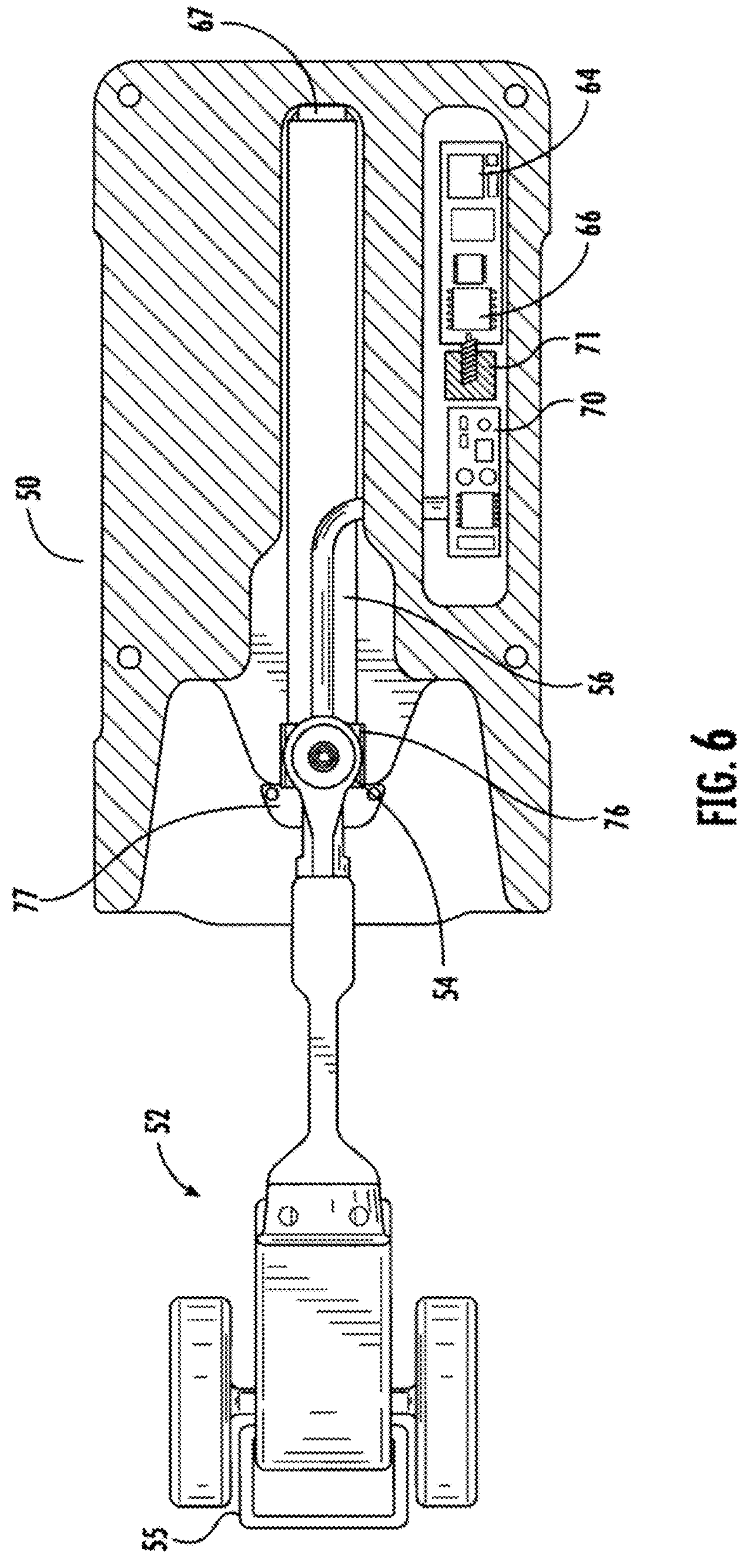
FIG. 6 is a cross sectional view of a deployable fixture.
Figure 7:
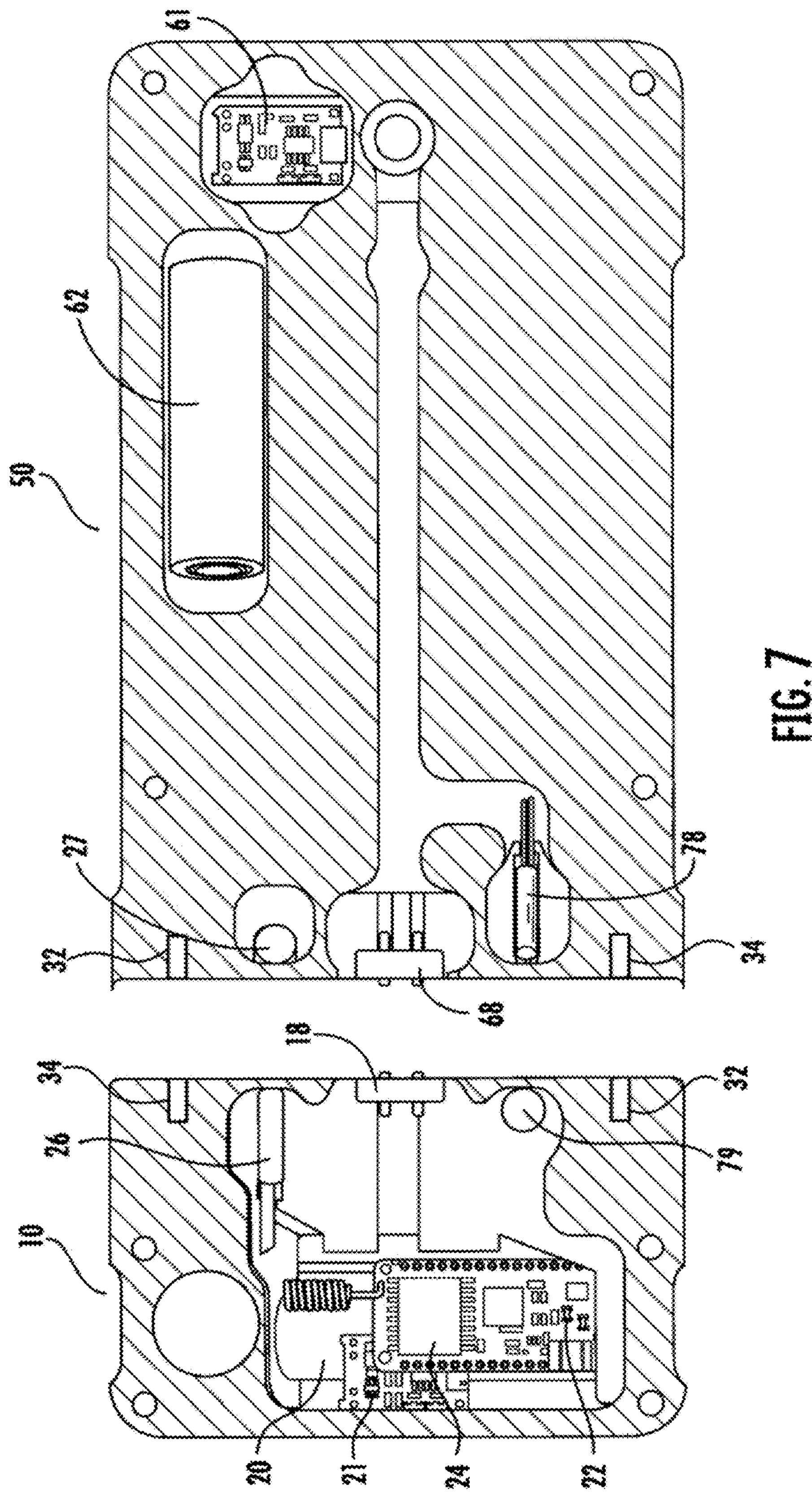
FIG. 7 is a top cross sectional view thereof.
Figure 8:
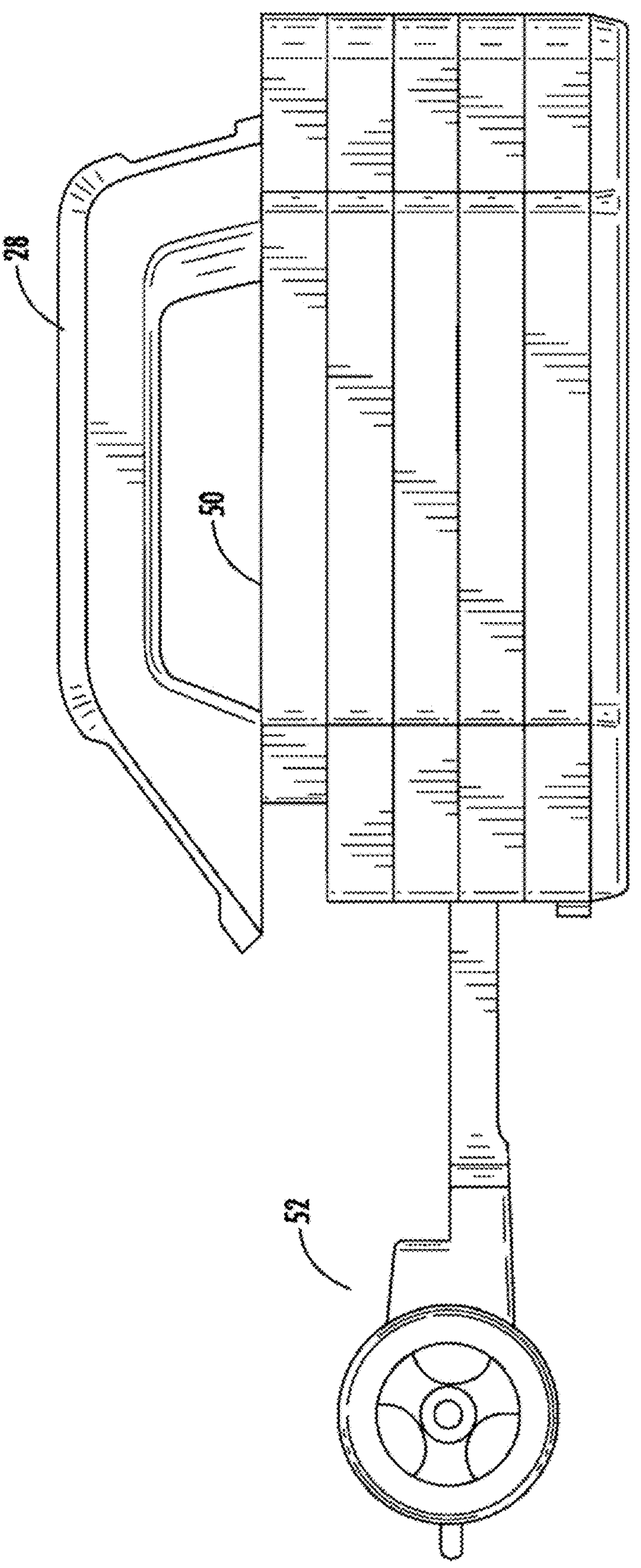
FIG. 8 is a side view thereof.
Figure 9:
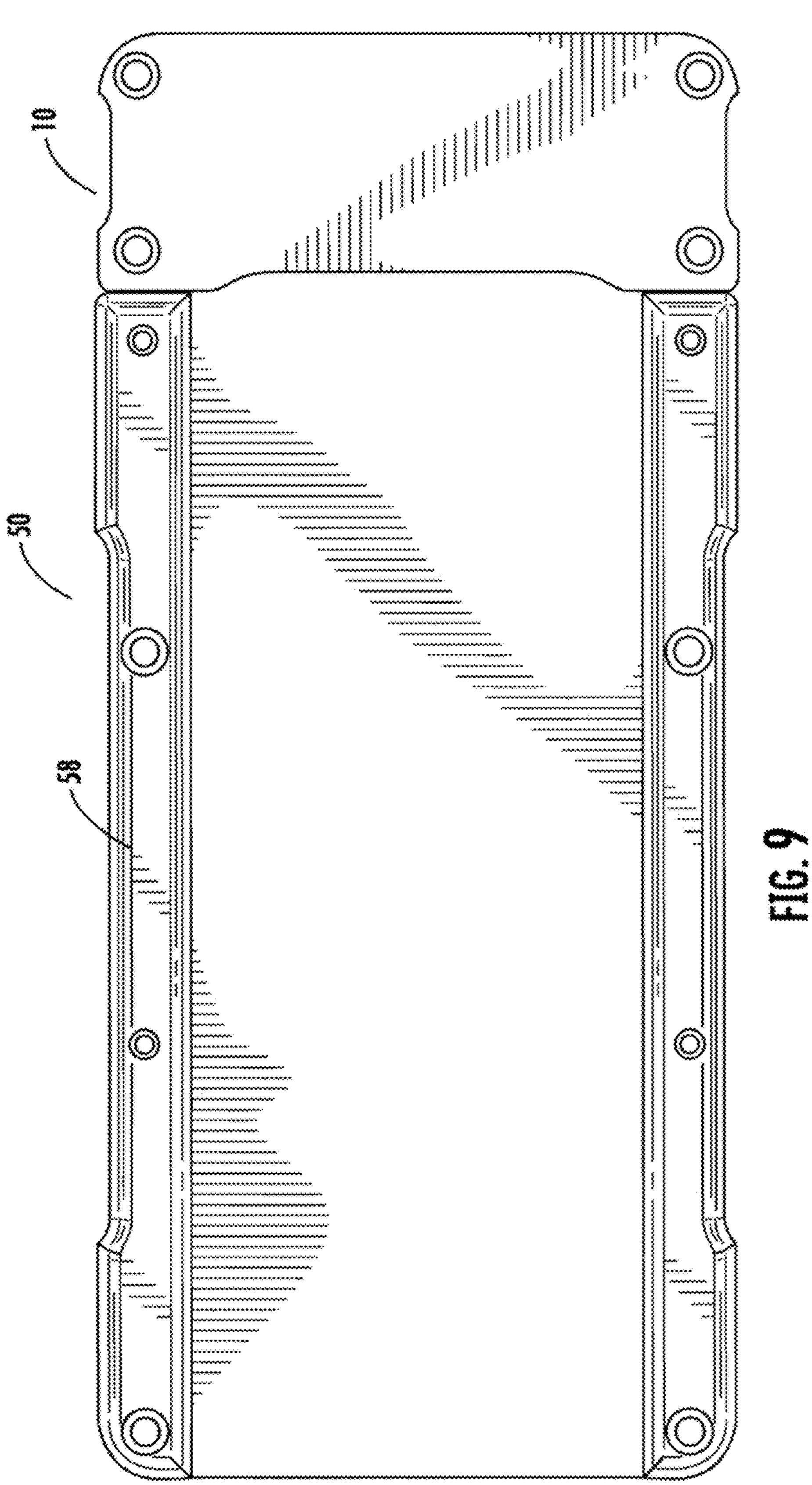
FIG. 9 is a bottom view thereof.
Figure 10:
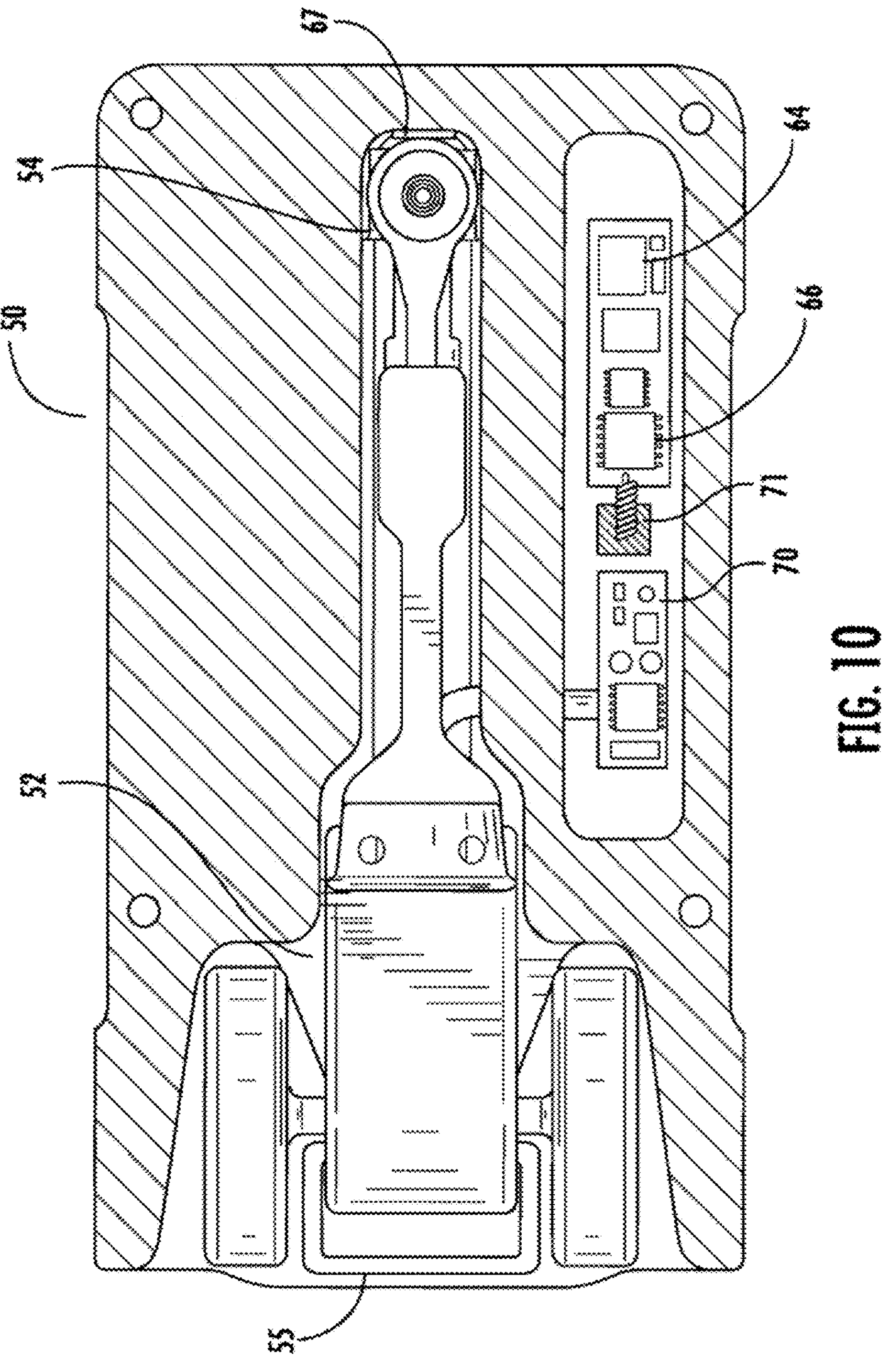
FIG. 10 is a cross section view of the deployable fixture within the housing.
Figure 11:
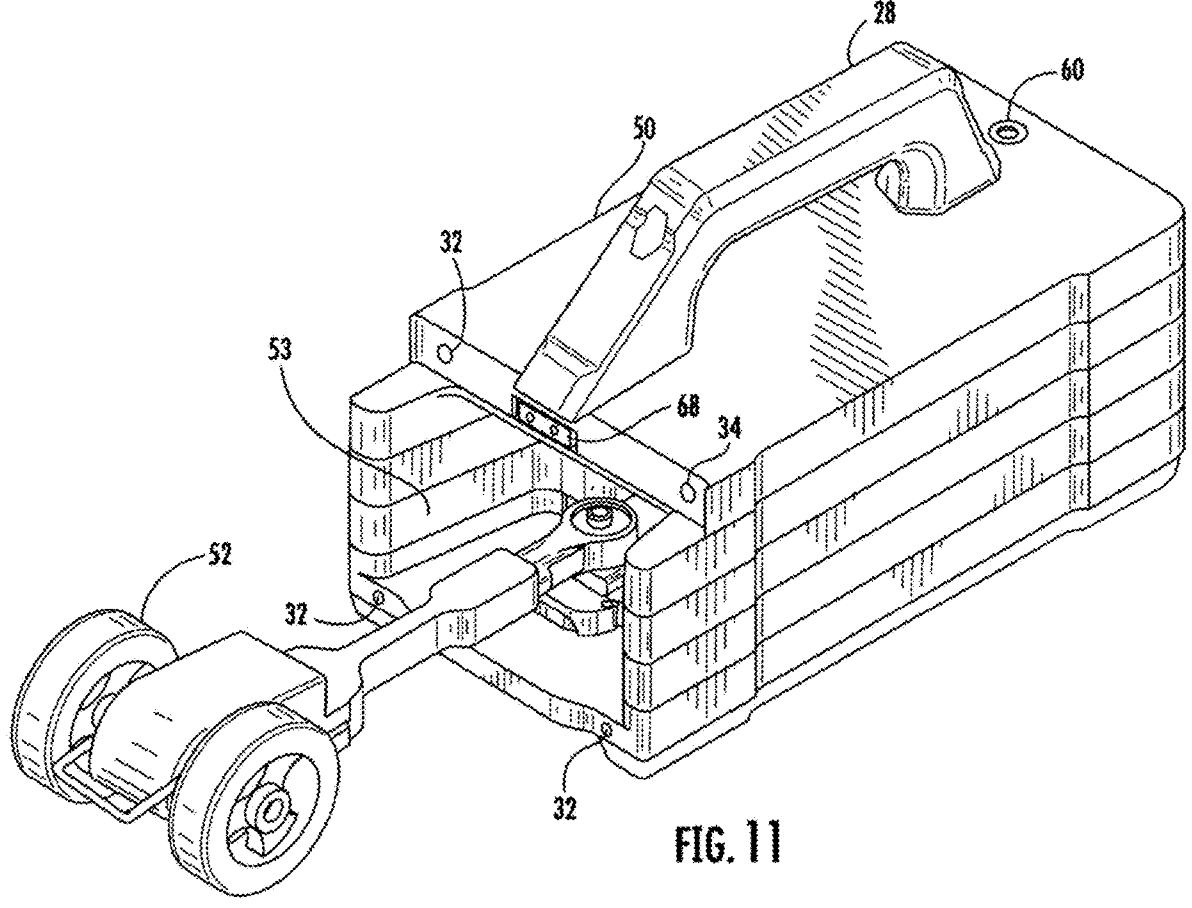
FIG. 11 is a perspective view of the deployable fixture.

A detailed embodiment of the conveyor belt calibration device is disclosed herein, however, it is to be understood that the disclosed embodiment is merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring to the FIGS. 1-13, illustrated is the device comprising a remote controller 10, a sensor assembly 52, and a housing 50. The remote controller 10 comprises an LCD screen 12 and a momentary button switch 14 affixed to the top surface of the remote controller 10. The location of the LCD screen 12 and the momentary button 14 is not limiting and may be placed on the front, bottom, or side surfaces of the remote controller 10. The remote controller 10 includes a body that encloses electronic circuitry powered by a rechargeable lithium battery 20. The electronic circuitry includes a microcontroller computer 22, a 900 MHz LoRa RF transceiver 24, a magnetic 2 pin charging connector 18, a lithium battery charger 21 with charge status LEDs, and a normally open reed switch 26. Embedded rare earth magnets 32 and steel rods 34 that do not interfere with the reed switch 26 are used to releasably couple the remote controller 10 to the housing 50. A reed switch magnet 27 is located inside the housing 50 that closes the reed switch 26 when the remote controller 10 is coupled to the housing 50. The LCD screen 12 displays the distance traveled or calculated speed by the encoder sensor or the calculated belt movement speed. The momentary button 14 allows the user to reset the current sensor reading to zero when pressed, change units of measurement when double pressed, or switch between length/speed measurement modes with a long press. The button interrupts power to the sensor to reset the sensor reading to zero, change units of measurement when power is interrupted twice during a short period, or switch between length and speed measurement modes when the power is interrupted for an extended period.

When the remote controller 10 mates with the housing 50, a magnetic charger 18 connects and the reed switch 26 closes to turn off the remote. The remote 10 has a screen 12 that tilts up at an angle allowing ease of viewing if the remote 10 is placed on a flat surface during the calibration test, or for ease of use when coupled to an industrial computer system during data input.

The housing 50 comprises a length measuring encoder sensor assembly 52 including wheels and bidirectional rotary encoder that are stored within a chamber 53. The term "length measuring sensor assembly" is used interchangeably with the term "deployable fixture". The sensor assembly 52 is attached to a ball joint 54 that rides along a linear guide track 56 and includes a grip 55 that allows a user to pull out the sensor assembly 52 with ease. In an embodiment, the bottom surface of the housing 50 includes rubberized feet 58 or the like slip resistant material, to inhibit movement of the housing. The electrical components encased within the housing 50 include a DC female barrel jack 60, a rechargeable lithium battery 62, a microcontroller computer 64, 900 MHZ LoRa RF transceiver 66, magnetic 2 pin charging connecter 68, male 76 and female 77 magnetic 3 pin data connectors, buck boost converter circuit 70, voltage divider circuit 71, lithium battery charger 61 with charge status LEDs, length sensor 74, and a reed switch 78. A reed switch magnet 79 is located inside the remote controller 10 that closes the reed switch 78 when the remote controller 10 is coupled to the housing 50. In a preferred embodiment, an LED light 51 on the housing 50 flashes red when the housing 50 is charging and the LED light flashes blue to indicate a full charge.

The rechargeable lithium battery 62 provides power to the electrical components and is charged via the lithium battery charge circuitry 61 that receives power from the female barrel jack power input 60. Power from the female barrel jack input is passed to the magnetic 2 pin charging connector 68 for the remote to charge. When the remote controller 10 is removed from the housing 50, a reed switch 78 opens, turning on the device. The length sensor 74 within the enclosure 53 connects to a ball joint 54 so it can rotate and mechanically self-align its wheels when movement begins with the conveyor belt it is measuring. When the length sensor 74 is pulled fully out, it snaps into place via the mating of the male magnetic data connector 76 and stationary female magnetic data connector 77 to keep it from moving during operation. Data is transmitted every time the wheeled length sensor 52 stops moving, or data can be sent live to the remote for instantaneous display/use.

When the sensor assembly 52 is placed within the chamber of the housing 50, a magnet 67 attracts to the ball joint 54 and keeps it in place during storage and transport. A handle 28 is provided atop the housing 50 to prevent said remote controller 10 from detaching from said housing 50, additionally six magnets 32 and two steel rods 34 that make contact between the housing and remote contact surfaces help prevent the remote controller 10 and the housing 50 from detaching. The housing 50 can be manufactured using a layer technique, suitable for CNC machining or 3D printing. Each layer having configuration constructed and arranged to fit the sensor assembly 52 and electronics within the remote controller.

Data collected from the length measuring sensor assembly 52 is compiled via a source code that reads an input from the length sensor 74 over time that is stored and incremented. The source code allows the transmission of data after measurement has been fully recorded and displays useful data onto the LCD screen 12 for the user to read. A deployable fixture unit configured to generate a unique transmitter code. Transmission using a communication protocol selected from the group consisting of LoRa, Bluetooth, Wi-Fi, and RFID. In a preferred embodiment, the deployable fixture code used in combination with a remote control code is programmed according to the following:

```
//James Egger
//Copyright © 2024
//Deployable Fixture Code
#include <SPI.h>
#include <RH_RF95.h>

const char FieldGatewayAddress [20] "11050230003UI ";
const char Deviceld[20] = "1105202300003BASE";
char PacketToSend[ 30]  =" ";

//Set value "TRUE" to display useful data in console.
bool debug = false:

//Length sensor input.
const int input = 6;

int pulse = 0:
int priorPulse =0;
int lastVar = 0;
unsigned long delayStart = 0://Stores current time
int16_t packetnum = 0;// packet counter


#if defined(ADAFRUIT_FEATHER_M0  | |
defined (ADAFRUIT_FEATHER_M0_EXPRESS)  | |  defined(Af)
#define RFM95_CS 8
#define RFM95_INT 3
#define RFM95_RST 4
#endif

#define RF95 FREQ 915.0

RH RF95 rf95 (RFM95_CS, RFM95_INT) ;  //  radio driver

void setup ( )

if (debug)

Serial.begin(115200) ;
while  (!Serial)  delay(1) ;
delay(100)  ;
Serial.println("Feather LoRa TX Test!") ;

```

-continued

```

strcpy(PacketToSend, FieldGatewayAddress) ;
 pinMode (RFM95_RST, OUTPUT) ;
 digitalWrite (RFM95_RST, HIGH) ;
digitalWrite (RFM95_RST, LOW ) ;
delay (10)  ;
 digitalWrite (RFM95_RST, HIGH) ;
delay(10) ;  //  manual reset


while (!rf95.init ( ) )

Serial.println ("LoRa radio init failed") ;
Serial.println ("Uncomment  '#define SERIAL DEBUG'
while (1) ;


if(debug)

Serial.printlln("LoRa radio init OK!") ;


 if (!rf95.setFrequency((RF95_FREQ) )

Serial.println("setFrequency failed") ;
while (1);


if (debug)

Serial.print ("Set Freq to: ") ;
Serial.println (RF95 FREQ) :


rf95.setTxPower(13, false) ;

pinMode(input, INPUT_PULLUP) ;
delayStart = millis( ) ;
lastVar = digitalRead(input) ;


void loop( ) {

//Read length sensor input.
int currentSensorValue = digitalRead(input) ;
//pulse values different, increment of millimeter has occured
if(currentSensorValue >= 1 && lastVar <1)

pulse++; //millimeter increment.
delayStart = millis( );//IReset timer.


else{

//Transmit data after measurement, And half second buffer
if(millis( ) – delayStart > 500) {
whenToSendData( ) ;
      }


lastVar = currentSensorValue;




void whenToSendData( )  {


if(pulse==priorPulse)

//If last value the same value currently, skip data


else{
itoa(pulse,PacketToSend+16, 10) ;

rf95.send((uint8_ t *)PacketToSend, sizeof(PacketToSend) ) ;

if(debug)
```

-continued

```
Serial.println(PacketToSend) ;


priorPulse pulse;
```

A remote control unit is configured to receive the deployable fixture code. In a preferred embodiment, the remote control code is programmed according to the following:

```
//James Egger
//Copyright © 2024
//Remote Control Code

#include <SPI.h>
 #include <RH _RF95.h>
 #include <LiquidCrystal_I2C.h>

const char FieldGatewayAddress[20] = “11052023000003BASE ";
const char DeviceId[20] = {“11052023000UI”};
char PacketToReceive[30] = “ “;


//ISet value "true" to display useful data in console.
bool debug = false;

//I Set LCD address to 0x27 for a 16 char 2 line display.
 LiquidCrystal_I2C 1cd(0x27, 20, 2) ;

cons in buttonInput = 6
int inboundData = 0;
int zeroOut 0 ·I
int ValueToDisplay =0

#if defined (ADAFRUIT FEATHER M0) | | defined (ADAFRUIT_FEATHER_M0_EXPRESS) | | defined(Af)
#define RFM95_CS 8
#define RFM95 INT 3
#define RFM95 RST 4
#endif

// Change to 434.0 or other frequency, must match RX’s freq!
#define RF95_FREQ 915. 0

Singleton instance of the radio driver
RH _RF95 rf95(RFM95_CS, RFM95_INT) ;

void setup( ) {


if (debug)
{
Serial.begin(115200) ;
while (!Serial) delay(1) ;
delay (100) ;
Serial.println("Feather LoRa RX Test !") ;
}

pinMode(LED_BUILTIN, OUTPUT) ;
 pinMode(REM95_RST, OUTPUT) ;
digitalWrite(RFM95_RST, HIGH) ;

// manual reset
digitalWrite(RFM95_RST, LOW) ;
delay(10) ;
digitalWrite(RFM95_RST, HIGH);
delay(10) ;


while (!rf95.init( ) )
{
Serial.println("LoRa radio init failed") ;
Serial.printlri("Uncomment ' #define SERIAL DEBUG' in RH_RF95.cpp for detailed debut
while (1) ;
}
```

-continued

```

if (debug)
{
Serial.println("LoRa radio init OK!");
}

if (!rf95.setFrequency(RF95_FREQ) )
{
Serial.Println("setFrequency failed") ;
while (1) ;


if (debug)
{
Serial.print("Set Freq to: “) ;
Serial. println(RF95_FREQ) ;
}

rf95.setTxPower(13, false) ;

pinMode(buttonlnput, INPUT_PULLUP) ;

lcd.init( ) ;
led. backlight ( ) ;
led.clear( ) ;
lcd.setCursor(0, 0) ;
lcd.print("Value in mm: ") ;
led.setCursor(0, 1) ;
lcd.print("0") ;

}

void loop( ) {

//Zeros out display
int buttonReset = digitalRead(buttonlnput) ;
if (!buttonReset)
{
zeroOut = inboundData;

led.setCursor(0, 1) ;
lcd.print("0 ") ;

if (debug)
{
Serial.print("Zero Out: ") ;
Serial.println(zeroOut) ;
}

delay(100) ;
}

if (rf95.available( ) )
{

uint8_tbuf[30];
uint8_t len = sizeof(buf);

if (rf95.recv(buf, &len) )
{
//IRH_RF95::printBuffer( "Received “," buf, len) ;

memcpy(PacketToReceive,buf,30) ;


char inboundDataAddress[16] ;
strncpy(inboundDataAddress, PacketToReceive, 15) ;
inboundDataAddress[15] = ‘\0’;

if (debug)
{
Serial.println(inboundDataAddress) ;
}

if(strcmp(inboundDataAddress,DeviceId)==0)
{

char inboundDataSubstr[16]; // Make sure it’s large enough for the slice
```

-continued

```
strncpy(inboundDataSubstr, &PacketToReceive[15] , 15) ;
inboundDataSubstr[15] = '\0' ;

inboundData = atoi(inboundDataSubstr) ;

if (inboundData < zeroOut)
{
zeroOut = 0;

if (debug) {
Serial.print("Zero Out Forced: " ) ;
Serial.println(zeroOut);
}

ValueToDisplay = inboundData ;

}

else
}
ValueToDisplay = inboundData - zeroOut ;
}


if (debug)
{
Serial.print("Received: ") ;
Serial.println(inboundData) ;
Serial.print("Display: ") ;
Serial.println(ValueToDisplay) ;
}

lcd.setCursor(0, 1) ;
lcd.print("0 ") ;
lcd.setCursor(0, 1) ;
lcd.print(ValueToDisplay) ;
            }
          }
        } ;
}
```

In operation, the remote control 10 is detached from the housing 50 exposing the chamber 53 housing the sensor assembly 52. The housing 50 is positioned adjacent to a conveyor belt and the sensor assembly 52 is partially withdrawn from the housing chamber 53 and placed on the conveyor belt to be tested. The sensor assembly 52 detects the wheel movement in accordance with the conveyor belt movement; the data collected is transmitted to the remote controller via radio frequency. Programming within the microprocessor interprets the data providing a visual output to the screen 12 and makes ready a data output that can be inputted to the conveyor belt control system to make any adjustments as determined necessary by the data. The sensor assembly 52 can be returned to the chamber 53 and the remote controller secured to the housing enclosing the sensor assembly within the chamber 53.

Figure 12:
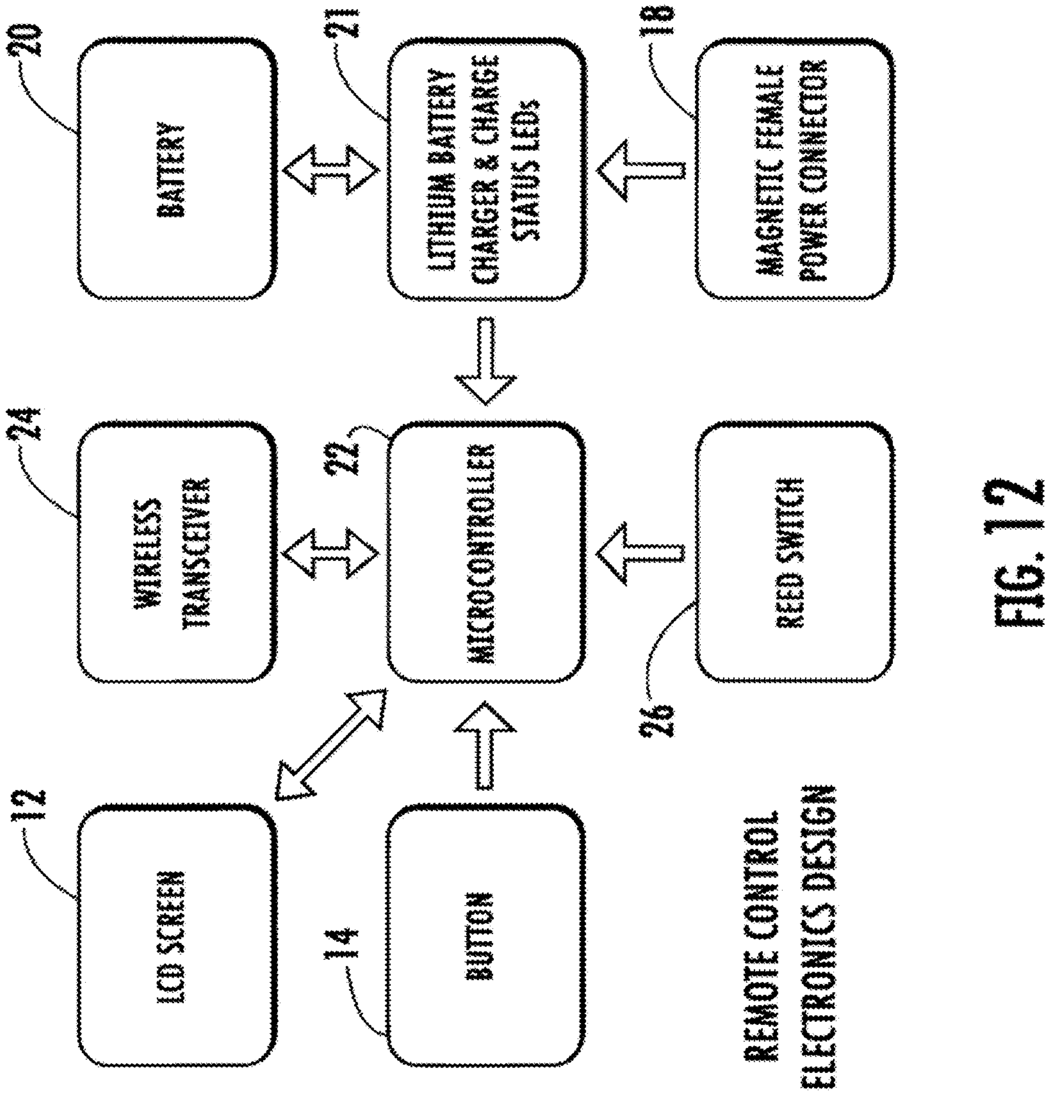
FIG. 12 is flow diagram of the remote controller electronics.
Figure 13:
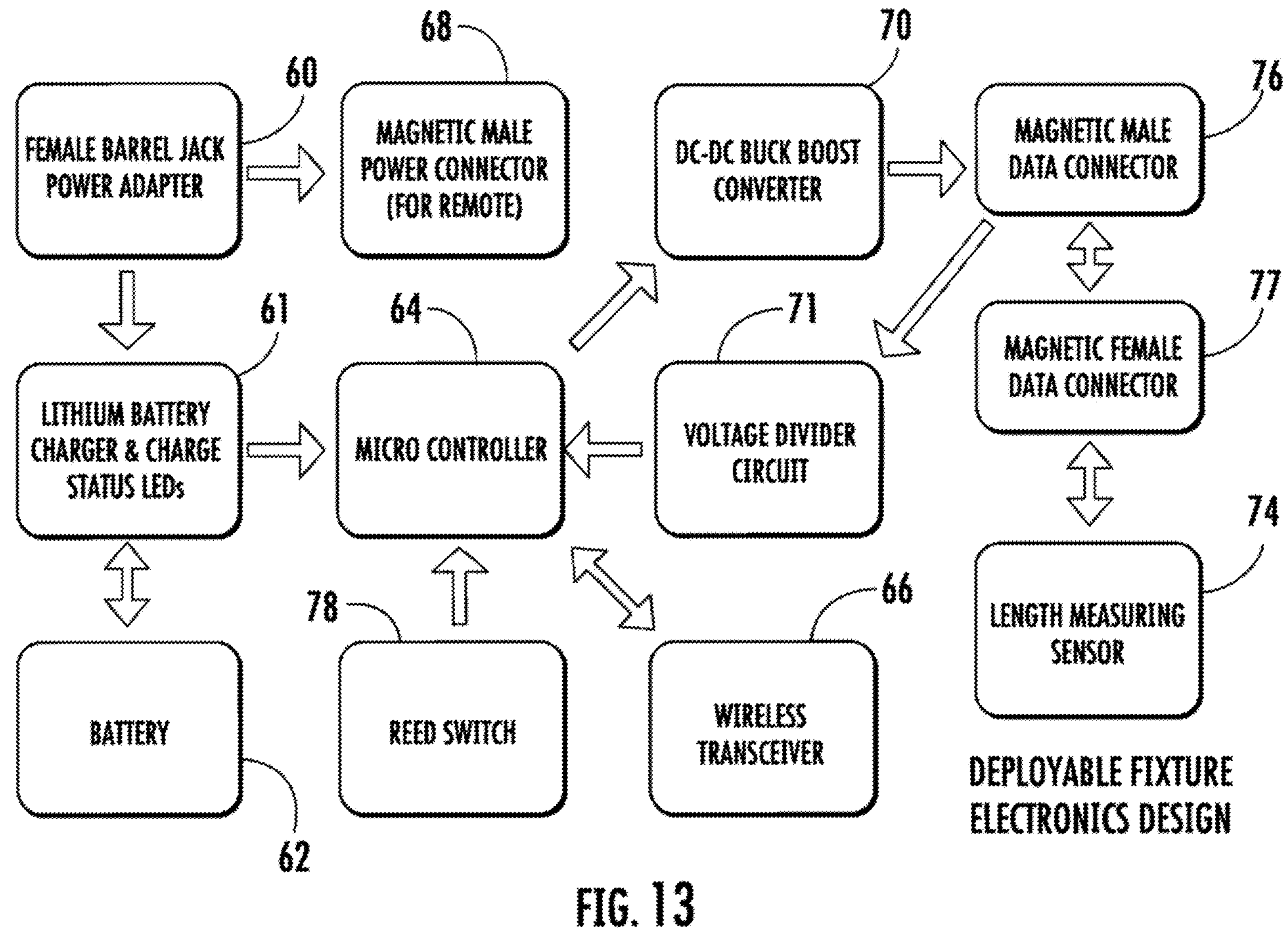
FIG. 13 is a flow diagram of the deployable fixture electronics.
Figure 14:
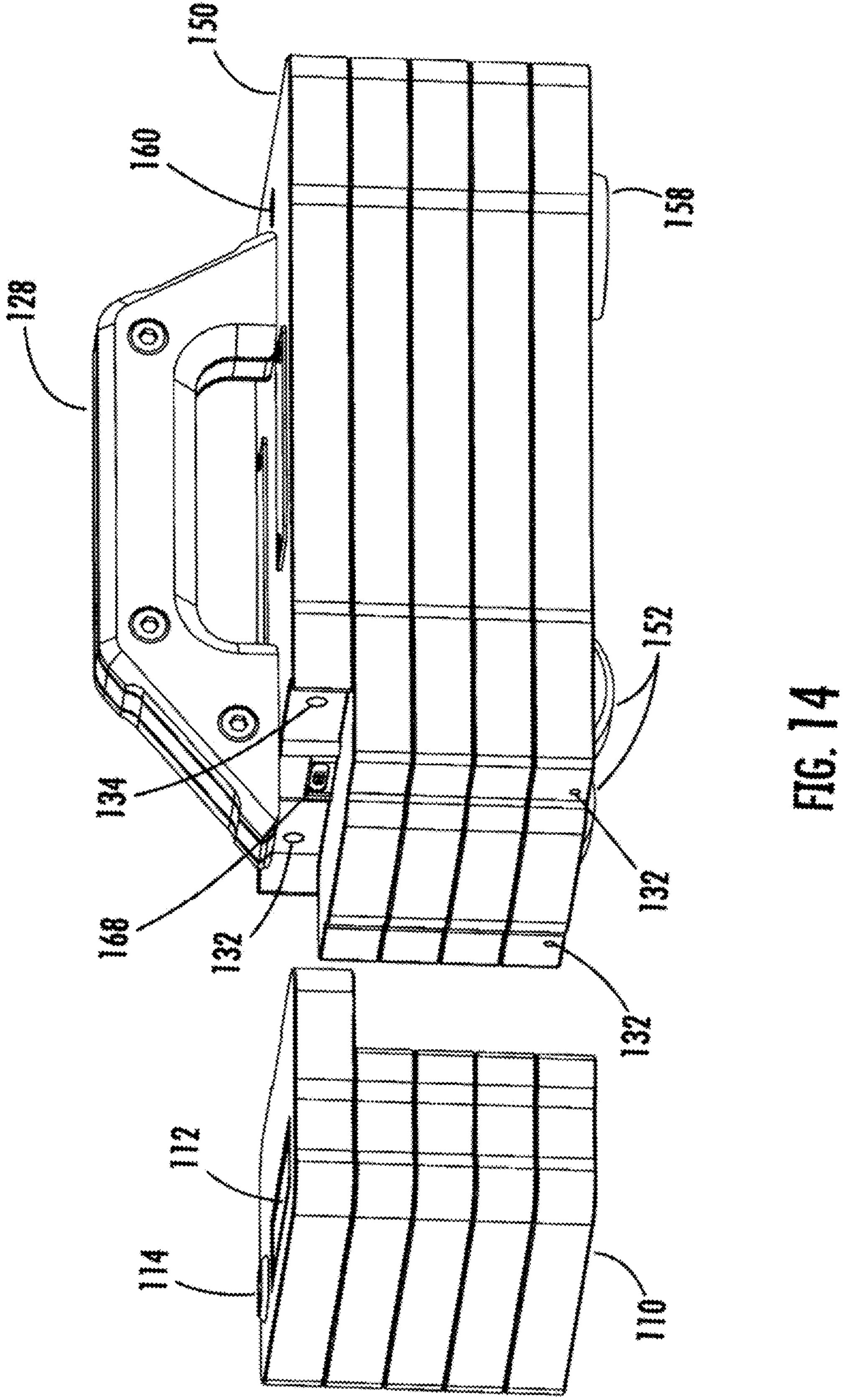
FIG. 14 is a perspective view of an alternative embodiment with wheels formed integral with the housing and a remote controller detached.
Figure 16:
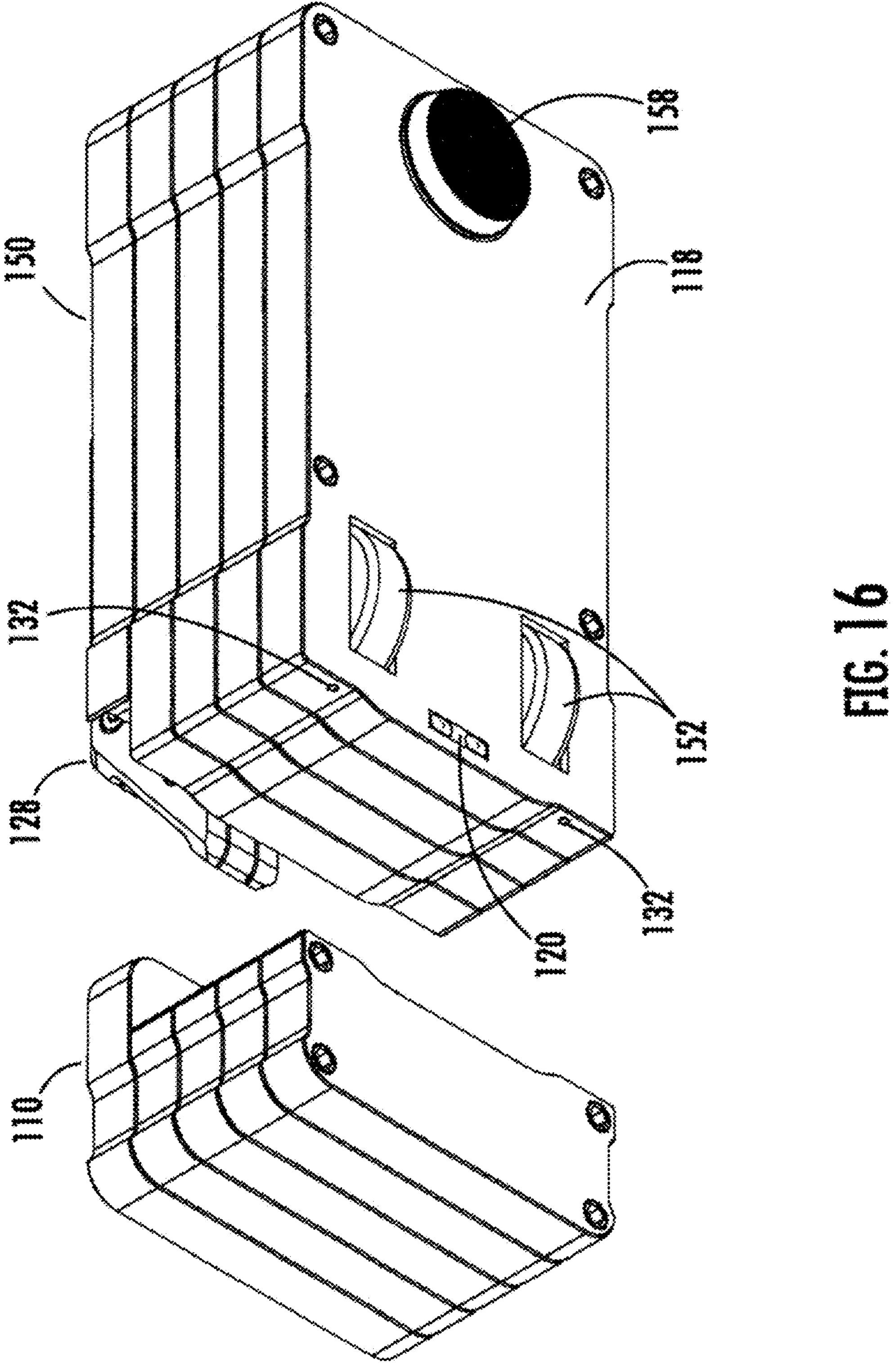
FIG. 16 is lower perspective view with the wheel sensor formed integral with the housing and the remote controller detached.
Figure 17:
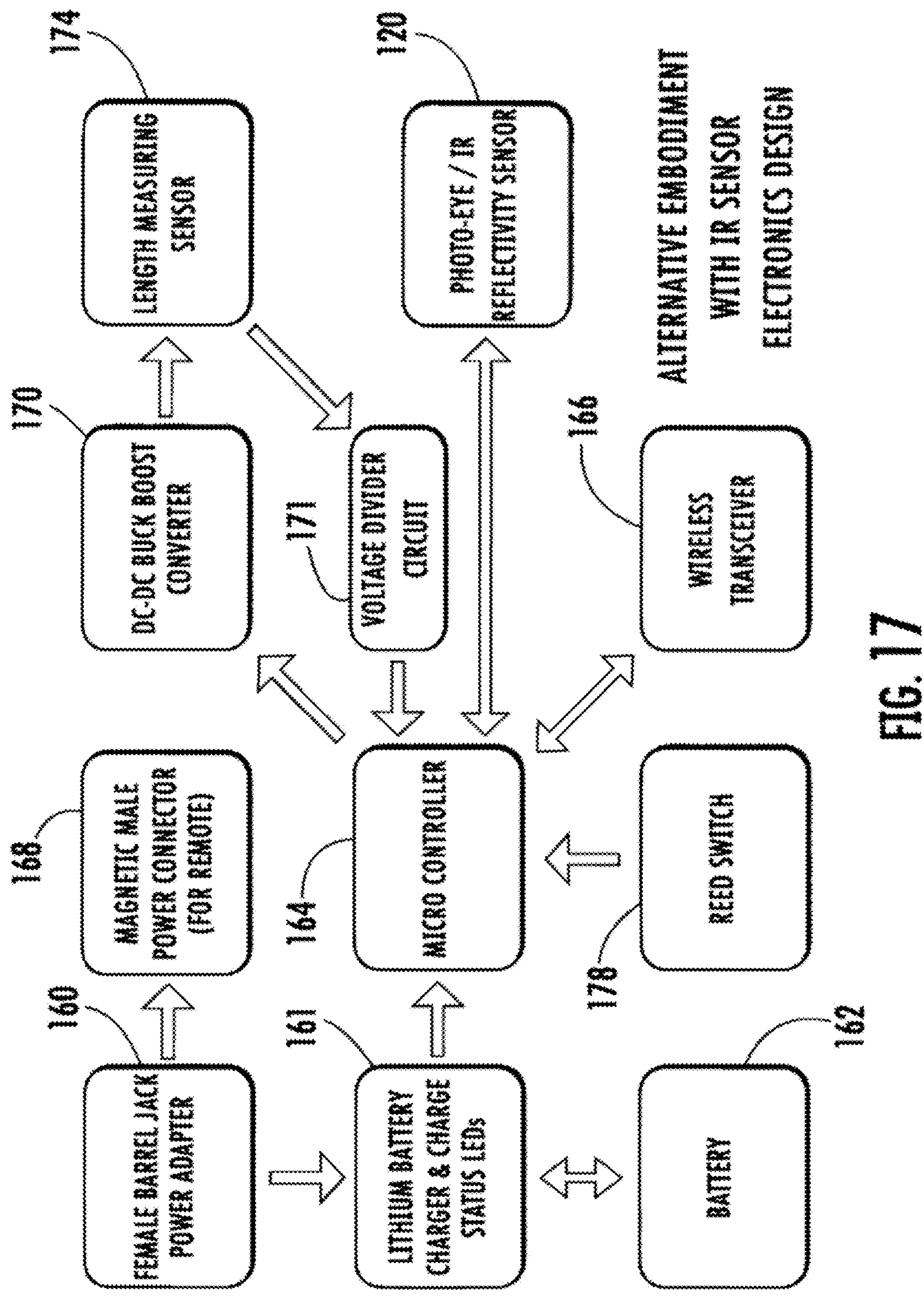
FIG. 17 is a flow diagram of the alternative embodiment electronics with an IR reflectivity sensor.

Referring to FIGS. 12; 14-17, set forth is another embodiment wherein wheels 152 remain integrated with the housing 150. The circuitry remains essentially the same as the prior embodiment with the exception of a fixed IR sensor 120 mounted to the lower surface 118 of the housing 150. In operation, the remote control 110 is detached from the housing 150. The housing 150 having wheels 152 placed on a conveyor belt wherein the wheels 152 are used to roll at the same speed as the conveyor belt, the housing 150 remains stationary by placement of a rotatable foot support 158 on a nonmoving section of the conveyor housing. In this embodiment the wheel movement is detected and monitored by a wheel encoder which consists of a sensor that measures the rotation of a wheel allowing it to track speed and position. For instance, a photodetector can be used to check slots or marks with the wheel. When the wheel rotates, the light source shines through the slots and the photodetector captures this as a series of pulses. These pulses correspond to the movement of the wheel wherein each pulse represents a small amount of wheel movement. Counting pulses lets the system calculate the distance traveled and the time between pulses can be used to determine the speed of the wheel.

In addition a photo-eye/IR reflectivity sensor 120 is placed on the bottom surface 118 of the housing 150. A piece of reflective tape, not shown, is placed on the conveyor belt wherein the sensor 120 detects the tape as it passes during a rotation. This provides a start and stop point on the conveyor belt so the wheeled length sensor can measure the full length of a conveyor belt, to help predict failure based on total belt stretch over its lifetime. In this embodiment, wheels 152 need only extend outwardly a minimal distance from the bottom surface 118 wherein the wheels 152 can roll along the upper surface of a conveyor belt.

The IR reflectivity sensor 120 detects a starting point (placed temporary reflective marking) that begins measurement of full length of conveyor belt using the wheel sensor 152 and then the sensor 120 detects the same start point to stop measurement wherein the data collected is transmitted to the remote controller 110 via radio frequency. Programming within a microprocessor interprets the data providing a visual output to the screen 112 on the remote controller 110 and makes ready a data output that can be inputted to the conveyor belt control system to make any adjustments as determined necessary by the data. To maintain the housing in a fixed position, the foot support 158 can be lowered from the bottom surface 118. Preferably, the foot support includes a polyaxial coupling 113 wherein the foot support can remain flat on a surface when the wheels 152 are not on a similar surface plane. Similar to the first embodiment, a handle 128 is provided atop the housing 150 to prevent the remote controller 110 from detaching from the housing 150 using the aforementioned magnet coupling. Namely, embedded rare earth magnets 132 and steel rods 134 are used to releasably couple the remote controller 110 to the housing 150.

In this embodiment the electrical components encased within the housing 150 include a DC female barrel jack 160, a rechargeable lithium battery 162, a microcontroller computer 164, 900 MHz LoRa RF transceiver 166, magnetic 2 pin charging connecter 168, buck boost converter circuit 170, voltage divider circuit 171, lithium battery charger 161 with charge status LEDs, length measuring sensor 174, and photo-eye/IR reflectivity sensor 120. Similar to the previous embodiment, a reed switch magnet is located inside the remote controller that closes the reed switch when the remote controller is coupled to the housing. In a preferred embodiment, an LED light on the housing flashes red when the housing is charging and the LED light flashes blue to indicate a full charge.

The rechargeable lithium battery 162 provides power to the electrical components and is charged via the lithium battery charge circuitry 161 that receives power from the female barrel jack power input 160. Power from the female barrel jack input is passed to the magnetic 2 pin charging connector 168 for the remote to charge. When the remote controller is removed from the housing, a reed switch opens, turning on the device. Data is transmitted every time the sensor detects a passing reflective tape, when movement stops, or data can be sent live to the remote for instantaneous display/use.

The housing 150 can be manufactured using a layer technique, suitable for CNC machining or 3D printing. Each layer having configuration constructed and arranged to fit the electronics within the housing and remote controller in a compact manner with minimal manufacturing costs.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims.

What is claimed is:

1. A device for calibrating a conveyor belt comprising:

a housing for a control circuit having a microcontroller computer, a 900 MHZ LoRa RF transceiver, a magnetic 2 pin charging connecter, a female and male magnetic 3 pin data connector, a buck boost converter circuit, a voltage divider circuit, a lithium battery charger with charge status LEDs, a female barrel jack adapter, a reed switch, a rechargeable lithium battery;

a pair of wheels extending outwardly from a first end of said bottom surface of said housing, an encoder operatively associated with at least one said wheel, said encoder providing conveyor belt length measurement by detecting wheel rotation;

a support base coupled to a polyaxial connector extends outwardly from a second end of said bottom surface of said housing; and a remote controller having an LCD screen and a momentary button affixed to a surface of said remote controller, said remote controller having a rechargeable lithium battery; and a momentary button for mode selection;

wherein said wheels are placed upon a conveyor belt wherein said encoder is used to detect length and speed of conveyor movement for calibration thereof.

2. The device of claim 1 including a sensor positioned on a bottom surface of said housing, said sensor constructed and arranged to check for a reflective marking when measuring full length of conveyor belt.

3. The device of claim 2 wherein said sensor is an IR reflectivity sensor for detection of a reflective element placed on the conveyor belt.

4. The device of claim 1 wherein data collected pertaining to the length of the conveyor belt is transmitted to the remote controller via radio frequency.

5. The device of claim 1, wherein said remote controller includes a screen for displaying the distance traveled or calculated speed.

6. The device of claim 1, wherein said momentary button permits mode setting wherein said sensor reads zero when power is interrupted by depressing said button, change units of measurement when power is interrupted by depressing said button twice during a short period, or switch between length and speed measurement modes when power is interrupted by depressing said button for an extended period.

7. The device of claim 1, wherein said screen is LCD and constructed to tilt for reading at an angle.

8. The device of claim 1, wherein said housing includes a housing support base coupled to a polyaxial connector with a slip resistant attachment.

9. The device of claim 1, wherein said rechargeable lithium battery is recharged through said magnetic 2 pin charging connector when said remote controller is attached to said housing.

10. The device of claim 1, wherein said reed switch opens when said remote controller is removed from said housing.

11. The device of claim 1, wherein said length sensor within said enclosure can rotate and mechanically self-align said wheels via the polyaxial connector during conveyor belt movement.

12. The device of claim 1, including a handle provided atop said housing coupled to said remote controller to prevent said remote controller from detaching from said housing.

13. The device of claim 1, wherein data collected from said wheel measuring encoder sensor is compiled via a source code that reads an input from said length sensor over time that is stored and incremented.

14. The device of claim 1, wherein said source code interprets data received from said sensors for measuring conveyor belt length for predicting conveyor belt failure or maintenance.

* * * * *